United States Patent
Hou et al.

(10) Patent No.: US 8,031,302 B2
(45) Date of Patent: Oct. 4, 2011

(54) DIRECTIONAL DIFFUSION FILM, POLARIZING PLATE, LIQUID CRYSTAL DISPLAY, AND METHOD OF MANUFACTURING DIRECTIONAL DIFFUSION FILM

(75) Inventors: Hin Hou, Ibaraki (JP); Taku Yamada, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 360 days.

(21) Appl. No.: 12/413,915

(22) Filed: Mar. 30, 2009

(65) Prior Publication Data
US 2009/0244447 A1   Oct. 1, 2009

(30) Foreign Application Priority Data
Mar. 28, 2008 (JP) .................................. 2008-085504

(51) Int. Cl.
*G02F 1/1335* (2006.01)
(52) U.S. Cl. .......................................... 349/112; 349/96
(58) Field of Classification Search ........................ None
See application file for complete search history.

(56) References Cited

U.S. PATENT DOCUMENTS

| | | | |
|---|---|---|---|
| 6,483,561 B2 | 11/2002 | Maruyama et al. | |
| 6,741,306 B2 | 5/2004 | Maruyama et al. | |
| 7,773,174 B2 | 8/2010 | Shimodaira et al. | |
| 2006/0262555 A1* | 11/2006 | Yi et al. | 362/561 |
| 2007/0030415 A1* | 2/2007 | Epstein | 349/64 |
| 2007/0297071 A1* | 12/2007 | Wurster | 359/707 |
| 2008/0303995 A1 | 12/2008 | Shimodaira et al. | |

FOREIGN PATENT DOCUMENTS

| JP | 10-010513 A | 1/1998 |
|---|---|---|
| JP | 2005-173057 A | 6/2005 |
| JP | 2005-352404 A | 12/2005 |
| JP | 2006-003506 A | 1/2006 |
| JP | 2006-133463 A | 5/2006 |
| JP | 2007-271673 A | 10/2007 |

OTHER PUBLICATIONS

Notification of Information Statement dated May 12, 2011, issued in corresponding Japanese Patent Application No. 2008-085504, including Figures I-X and Tables I-IV.

* cited by examiner

*Primary Examiner* — Tina Wong
(74) *Attorney, Agent, or Firm* — Westerman, Hattori, Daniels & Adrian, LLP (57) ABSTRACT

A directional diffusion film with diffusion properties that vary depending on the incidence angle is characterized in that a diffusion axis direction is in the range of 20° to 50° with respect to a normal direction of the film, and a diffusion half-value angle is at least 20° and lower than 90°. The diffusion axis direction is a light irradiation direction in which the strongest diffusion light is obtained when the film is irradiated with light. The diffusion half-value angle is a diffusion angle at which intensity of outgoing diffusion light at a plane A is 50% of the peak intensity, with the plane A containing the normal direction and the diffusion axis direction of the directional diffusion film, when collimated light is incident at an incidence angle of 30° from the normal direction of the directional diffusion film in the plane A. A polarizing plate containing the directional diffusion film. An LCD device containing the directional diffusion film.

13 Claims, 6 Drawing Sheets

DIRECTIONAL DIFFUSION FILM, POLARIZING PLATE, LIQUID CRYSTAL DISPLAY, AND METHOD OF MANUFACTURING DIRECTIONAL DIFFUSION FILM

CROSS-REFERENCE TO RELATED APPLICATIONS

This application claims priority from Japanese Patent Application No. 2008-085504 filed on Mar. 28, 2008 the entire contents of which are hereby incorporated by reference.

BACKGROUND OF THE INVENTION

1. Field of the Invention

The present invention relates generally to directional diffusion films, polarizing plates, liquid crystal displays, and methods of manufacturing directional diffusion films.

2. Description of the Related Art

Recently, liquid crystal displays (LCDs) are used widely in, for example, PCs, automated teller machines (ATMs), and car navigation system equipment. Among LCDs, in a transmissive LCD with a twisted nematic (TN) mode employed therein, for example, viewing angle dependency is high, picture quality changes considerably when it is viewed from an oblique direction at a certain angle or more, and an image to be displayed in black under normal conditions appears whitish, and thus the contrast ratio may decrease or tone reversal may cause difficulty in viewing normal display. Therefore, a method has been proposed in which a light diffusion film is disposed on a front surface of a device for the purpose of securing the viewing angle of a LCD (for example, see JP 10(1998)-10513 A). According to this proposal, the tone reversal is suppressed and the viewing angle increases but there is a problem in that the contrast in the front direction decreases. Therefore, a directional light scattering film has been proposed that cancels the decrease in image quality while balancing a tone reversal prevention effect with contrast maintenance (for instance, see JP2006-133463 A). However, when such a light scattering film is disposed, the tone reversal was improved to some extent but with respect to the downward direction of the liquid crystal panel, it covers only a range of up to around 45°, and the contrast in the front direction of the liquid crystal panel also is improved but is still reduced by 20 to 30%. Accordingly, at present, it cannot be always said that the contrast is sufficient.

As described above, in the methods according to conventional light scattering techniques, the directional scattering properties (properties that the scattering properties vary when the incidence angle is changed) can be obtained only in a specific direction. Accordingly, light that is incident from a specific direction is scattered substantially uniformly when the effect of improving viewing angle dependency is obtained in the specific direction. Therefore a phenomenon occurs that display quality with respect to the other directions deteriorates. That is, the tone reversal suppression in the downward direction of the liquid crystal panel and the maintenance of the front contrast are in a trade-off relationship.

SUMMARY OF THE INVENTION

The present invention is intended to provide a directional diffusion film, a polarizing plate, and a liquid crystal display, with the directional diffusion film being able to achieve both an increase in contrast and an increase in viewing angle with a good contrast ratio over a wide viewing angle in a liquid crystal display. Furthermore, the present invention also is intended to manufacture the aforementioned directional diffusion film that exhibits good directional diffusion by a continuous process more easily as compared to a conventional method.

In order to achieve the aforementioned object, the directional diffusion film of the present invention is one with diffusion properties that vary depending on an incidence angle, wherein a diffusion axis direction is in the range of 20° to 50° with respect to a normal direction of the film, and a diffusion half-value angle is at least 20° and lower than 90°, where the diffusion axis direction is a light irradiation direction in which the strongest diffusion light is obtained when the film is irradiated with light, and the diffusion half-value angle is a diffusion angle at which intensity of outgoing diffusion light at a plane A is 50% of the peak intensity, with the plane A containing the normal direction and the diffusion axis direction of the directional diffusion film, when collimated light is incident at an incidence angle of 30° from the normal direction of the directional diffusion film in the plane A.

The polarizing plate of the present invention is one including a polarizer and a protective layer that are stacked together, wherein the protective layer is the aforementioned directional diffusion film according to the present invention.

The liquid crystal display of the present invention is one including a directional diffusion film or a polarizing plate, wherein the directional diffusion film is the aforementioned directional diffusion film of the present invention, and the polarizing plate is the aforementioned polarizing plate of the present invention.

The method of manufacturing a directional diffusion film of the present invention includes: preparing at least an original diffusion film and a photosensitive resin made of at least two types of materials that are different in refractive index from each other; forming a laminate by stacking the original diffusion film and the photosensitive resin together; and irradiating the laminate with a collimated laser beam from a side of the original diffusion film, where in the process of irradiating, the laminate is irradiated with the laser beam under such conditions that a half-value width of the original diffusion film is in a range of 15° to 45° and an irradiation angle of the laser beam with respect to the original diffusion film is in a range of 15° to 45°, where the half-value width denotes a diffusion angle obtained when the intensity of outgoing diffusion light is 50% of the peak intensity.

The directional diffusion film of the present invention makes it possible to achieve both maintenance of the contrast in the front direction and prevention of occurrence of a tone reversal phenomenon throughout the region in the downward direction of the screen of a liquid crystal display. In conventional products, the tone reversal phenomenon can be prevented from occurring only in the region located within 45 degrees in the downward direction of the screen. However, in the directional diffusion film of the present invention, it is possible to prevent the tone reversal phenomenon from occurring even in a region located within, for example, 50 degrees in the downward direction of the screen. Furthermore, according to the method of manufacturing a directional diffusion film of the present invention, film thickness of the photosensitive resin is controlled using an original diffusion film with a half-value width within a predetermined range, and the irradiation light emitted from a laser beam source during laser beam irradiation is set at a predetermined angle, so that a directional diffusion film that exhibits the good directional diffusion described above can be manufactured by a continuous process more easily as compared to a conventional method.

BRIEF DESCRIPTION OF THE DRAWINGS

FIG. 1 shows schematic diagrams for explaining diffusion properties in the present invention.

FIG. 5 shows schematic diagrams for explaining a method of measuring diffusion properties according to the present invention.

FIG. 7 shows diagrams for explaining the direction in which a directional diffusion film is disposed in Example 1.

FIG. 8 shows diagrams for explaining an image processing method in the present invention.

FIG. 9 shows diagrams for explaining the method of measuring a diffusion half-value angle of a directional diffusion film according to the present invention.

DETAILED DESCRIPTION OF THE INVENTION

In the directional diffusion film of the present invention, it is preferable that the ratio of the length in the polar angle direction to the length in the azimuthal direction be in the range of 1 to 3, where the ratio is a ratio of the length in the polar angle direction/the length in the azimuthal direction that is obtained by measuring the length of an axis located on the plane A (the length in the polar angle direction) and the length of the other axis (the length in the azimuthal direction) with respect to the long axis and the short axis of an ellipse shape, with the plane A containing the normal direction and the diffusion axis direction of the directional diffusion film, when the collimated light is incident at an incidence angle of 30° from the normal direction of the directional diffusion film in the plane A and a diffusion image of the collimated light projected onto a projection plate placed in parallel with the directional diffusion film is fitted into the ellipse shape.

In the polarizing plate of the present invention, it is preferable that the protective layer be stacked on each surface of the polarizer and at least one of the protective layers stacked on both the surfaces be the aforementioned directional diffusion film according to the present invention.

Preferably, the polarizing plate of the present invention includes a hard-coating layer.

Preferably, the polarizing plate of the present invention includes an antiglare layer.

Preferably, the polarizing plate of the present invention includes an antireflection layer.

In the liquid crystal display of the present invention, it is preferable that the polarizing plate of the present invention and an optical compensation layer be provided on a viewing side and be disposed, with a transmission axis direction of the polarizer of the polarizing plate being the same direction as an alignment axis direction of the optical compensation layer, and with the diffusion axis direction of the directional diffusion film of the polarizing plate forming an angle in the range of −105 to −165° with respect to the alignment axis direction of the optical compensation layer.

In the method of manufacturing a directional diffusion film of the present invention, it is preferable that an original diffusion film with anisotropy be used as the original diffusion film, and in the process of irradiating, the laminate be irradiated with the laser beam, with the original diffusion film with anisotropy being placed so that a direction in which the half-value width thereof is the maximum is a direction perpendicular to the rotation axis of the irradiation angle.

Preferably, the directional diffusion film of the present invention is manufactured by the aforementioned method of manufacturing a directional diffusion film of the present invention. However, the method of manufacturing the directional diffusion film is not limited to the aforementioned manufacturing method.

Next, the present invention is described in detail. However, the present invention is not limited by the following descriptions.

Figure 1A:
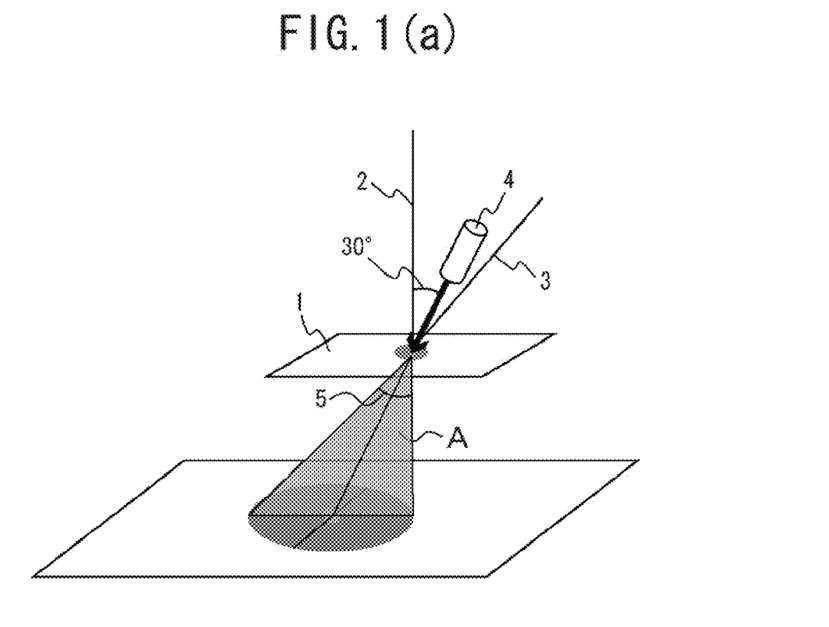
FIG. 1(a) is a schematic diagram for explaining a polar angle and FIG. 1(b) is a schematic diagram for explaining an azimuthal angle.
Figure 1B:
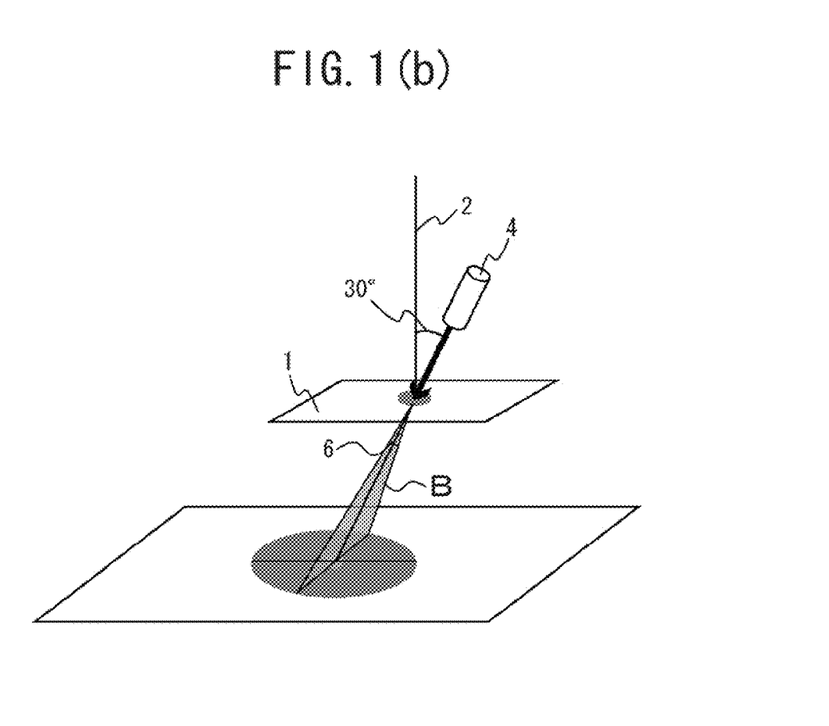

In the present invention, the term "directional diffusion" indicates a diffusion state where the diffusion properties of outgoing light vary depending on the incident direction and refers to the property that diffusion occurs with respect to light incident from a particular direction. In the present invention, the diffusion axis direction denotes the light irradiation direction in which the strongest diffusion light is obtained when the film is irradiated with light. FIGS. 1(a) and 1(b) show schematic perspective diagrams for explaining diffusion properties in the present invention. As shown in FIG. 1(a), the diffusion half-value angle in the present invention is a diffusion angle at which the intensity of outgoing diffusion light at a plane A is 50% of the peak intensity, with the plane A containing a normal direction 2 and a diffusion axis direction 3 of a directional diffusion film 1, when collimated light 4 is incident at an incident angle of 30° from the normal direction 2 of the directional diffusion film 1 in the plane A.

In the directional diffusion film of the present invention, the diffusion axis direction is in the range of 20° to 50° with respect to the normal direction of the film, and the diffusion half-value angle is at least 20° and lower than 90°. The diffusion axis direction is preferably in the range of 25° to 47° and more preferably in the range of 30° to 45°. The diffusion half-value angle is preferably at least 25° and lower than 90°, and more preferably at least 30° and lower than 90°.

Preferably, in the directional diffusion film of the present invention, the ratio of the length in the polar angle direction to the length in the azimuthal direction is in the range of 1 to 3. In FIG. 1, the polar angle 5 and the azimuthal angle 6 are angles shown in FIGS. 1(a) and 1(b), respectively. That is, the polar angle 5 is a diffusion angle of diffusion light in the plane A obtained when collimated light 4 is incident at an incidence angle of 30° from the normal direction 2 of the directional diffusion film 1 in the plane A, with the plane A containing the normal direction 2 and the diffusion axis direction 3 of the directional diffusion film 1. On the other hand, the azimuthal angle 6 is a diffusion angle of diffusion light in a plane B in which the diffusion of diffusion light is greatest in the direction orthogonal to the plane A. In the present invention, the ratio between the length in the azimuthal direction and the length in the polar angle direction was calculated, as the diffusion properties of the directional diffusion film, by the method described later in the examples, as the ratio of the length of the axis in the polar angle direction to the length of the axis in the azimuthal direction, with a diffusion image of collimated light that has passed through the directional diffusion film being fitted into an ellipse shape.

The ratio of the length in the polar angle direction to the length in the azimuthal direction (the length in the polar angle direction/the length in the azimuthal direction) is preferably in the range of 1.1 to 2.5 and more preferably in the range of 1.2 to 2.0.

Figure 2:
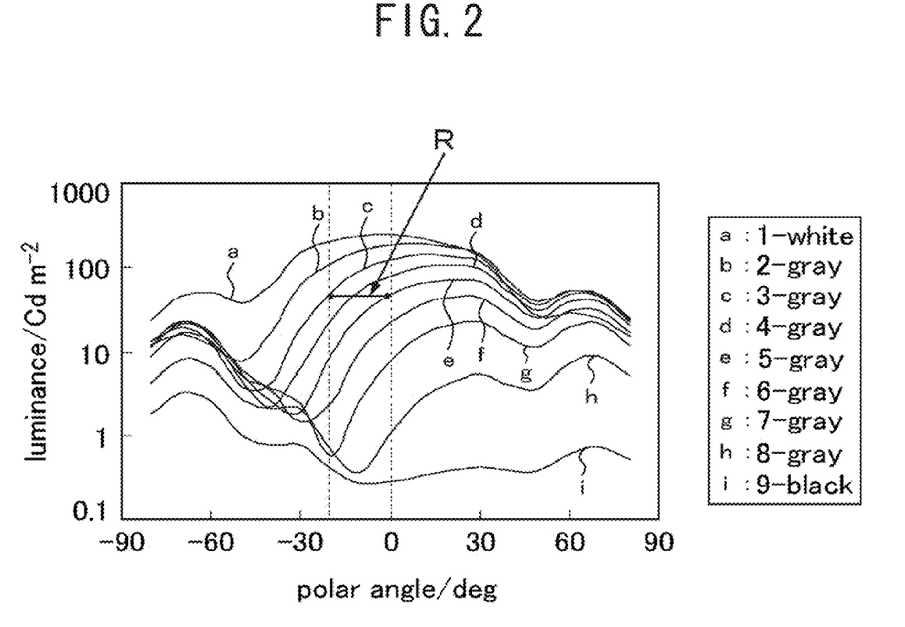
FIG. 2 is a graph showing an example of the results of measurement of tone properties in the vertical direction of a liquid crystal panel (TN) with no directional diffusion film of the present invention used therein.

The relationship between the present invention and the effects thereof is surmised as follows but the present invention is not limited by this surmise by any means. That is, FIG. 2 shows an example of results of measurement of luminance of 9 grayscales from white to black within a viewing angle of +80° to −80° in a transmissive liquid crystal display panel. Generally, the liquid crystal panel (TN panel) has tone properties in which the strongest tone reversal occurs in the region between 20° and 50° in the downward direction of the panel. Therefore, the incidence angle at which light diffusion occurs in the directional diffusion film was selected so as to be within an angle region of 20° to 50° with respect to the normal line of the film. However, the directional diffusion that occurs merely in that direction results in a decrease in the contrast in the front direction. However, when using a directional diffusion film having light diffusion properties in which with respect to collimated light that is incident at 30° from the normal direction, diffusion light is spread so that the diffusion half-value angle is in the range of 20° or more and preferably the ratio (the length in the polar angle direction/the length in the azimuthal direction) is in the range of 1 to 3, leaked light in black display portions in a liquid crystal panel is diffused optimally and thereby no tone reversal occurs in all the viewing angles in the downward direction of the panel. That is, the use of such a directional diffusion film makes it possible to prevent tone reversal from occurring within a wider viewing angle range than that obtained by conventional techniques. On the other hand, with respect to the incident light in the front direction, since it is transmitted without being scattered, an image with sufficiently high image quality can be observed without decreasing the contrast in the front direction of the panel. That is, providing the conditions of the present invention makes it possible to obtain a directional diffusion film that drastically cancels the trade-off relationship between maintenance of the contrast and control of tone reversal of a transmissive liquid crystal display panel.

The directional diffusion film of the present invention can be manufactured by a method including, for example, preparing at least an original diffusion film and a photosensitive resin made of at least two types of materials that are different in refractive index from each other, forming a laminate by stacking the original diffusion film and the photosensitive resin together, and irradiating the laminate with a collimated laser beam from the side of the original diffusion film. In the aforementioned irradiating step, the laminate is irradiated with the laser beam under such conditions that the half-value width of the original diffusion film is in the range of 15° to 45° and the irradiation angle of the laser beam with respect to the original diffusion film is in the range of 15° to 45°. In this case, the "half-value width" denotes the diffusion angle at which the intensity of outgoing diffusion light is 50% of the peak intensity.

The half-value width of the original diffusion film is preferably in the range of 16° to 40° and more preferably in the range of 17° to 35°. Furthermore, the angle at which the original diffusion film is irradiated with the laser beam is preferably in the range of 17° to 43° and more preferably in the range of 20° to 40°.

The photosensitive resin to be used is one made of at least two types of materials that are different in refractive index from each other. Monomers with a plurality of types of photosensitivities that are different in refractive index from one another may be mixed together for use. A photopolymerization initiator is mixed into the photosensitive resin. For the monomers, it also is possible to use, for example, commercial photocurable monomers. Furthermore, the use of photocurable hologram recording materials also is preferable. Examples of the hologram recording materials include OPTOREM (trade name; registered trademark) manufactured by Nippon Paint Co., Ltd., OMNIDEX (trade name) manufactured by Du Pont Kabushiki Kaisha, and hologram recording materials manufactured by Daiso Co., Ltd. Optorem (registered trademark) is a hybrid photocurable photopolymer material that utilizes photoradical polymerization and photocation polymerization in combination.

The photosensitive resin contains materials that are different in refractive index from each other but the difference in the refractive index is preferably more than 0.01 and more preferably more than 0.02. The respective materials that are different in refractive index from each other are cured under different curing conditions. When all the materials that are different in refractive index are resins that are cured through photopolymerization, it is preferable that they be different in, for example, curing rate or wavelength range in which photopolymerization starts.

Examples of the applicable photopolymerization initiator include 2,2-dimethoxy-2-phenylacetophenone, acetophenone, benzophenone, xanthone, 3-methylacetophenone, 4-chlorobenzophenone, 4,4'-dimethoxybenzophenone, benzoin propyl ether, benzyl dimethyl ketal, N, N,N',N'-tetramethyl-4,4'-diaminobenzophenone, 1-(4-isopropylphenyl)-2-hydroxy-2-methylpropane-1-one, and other thioxanthone compounds.

The photosensitive resin further may contain any suitable additives. Examples of the additives include a surfactant, plasticizer, heat stabilizer, light stabilizer, lubricant, antioxidant, ultraviolet absorbing agent, flame retardant, colorant, antistatic agent, cross-linking agent, thickener, and metals.

The surfactant is blended for the purpose of, for example, forming a smooth surface when the photosensitive resin is spread over the original diffusion film to form a photosensitive resin layer. Examples of the surfactant include a silicone surfactant, acrylic surfactant, and fluorochemical surfactant.

Examples of the method of forming the photosensitive resin layer include a spin coating method, roll coating method, flow coating method, printing method, dip coating method, casting film forming method, bar coating method, and gravure printing method. Furthermore, as described later, it also can be formed by an easy method in which the photosensitive resin is sandwiched between another substrate and the original diffusion film.

The thickness of the photosensitive resin layer can be set in a suitable range according to the performance such as the difference in refractive index between materials composing the photosensitive resin. For example, it is preferably in the range of 5 to 100 μm and more preferably in the range of 10 to 45 μm.

The original diffusion film to be used is a diffusion film having a half-value width in a range of 15° to 45°. The aforementioned photosensitive resin is stacked on the original diffusion film, which is then irradiated with collimated light from the diffusion film side. Thus optical information of the original diffusion film can be recorded in the photosensitive resin.

The collimated light with which the laminate is irradiated needs to contain a wavelength that can polymerize and cure the photosensitive resin. When the aforementioned directional diffusion film is to be formed using a Nd:YAG laser (SHG: 532 nm), the light intensity is preferably in the range of 0.01 to 1000 mW/cm$^2$. When the light intensity is lower than 0.01 mW/cm$^2$, it takes a long time to cure and therefore the production efficiency may be deteriorated. When it exceeds 1000 mW/cm$^2$, the photosensitive resin is cured too quickly to obtain structure formation, and thereby desired light diffusion properties may not be able to be exhibited. The light intensity is more preferably in the range of 0.1 to 100 mW/cm$^2$. In place of the above-mentioned Nd:YAG laser, a Nd:YVO$_4$ laser (532 nm), an argon ion laser (488 nm), a Nd:YAG laser (THG: 355 nm), a LED light source (405 nm), or a g-ray (436 nm) also can be used by selecting the polymerization initiator for the photosensitive resin.

According to the aforementioned method, since the diffusion axis is formed in the direction that is substantially in parallel with the light irradiation direction, the diffusion axis direction can be controlled through the control of the light irradiation direction with respect to the laminate. For instance, when the laminate is irradiated with light from the normal direction thereof, the diffusion axis is formed in the direction that is substantially in parallel with the thickness direction of the laminate. On the other hand, when the laminate is irradiated with light from an oblique direction, the diffusion axis is formed in the oblique direction with respect to the thickness direction of the laminate.

In the step of laser beam irradiation, for example, the laminate can be irradiated with the laser beam by a continuous process while being moved on a conveyor, or it also can be irradiated by batch processing in which the whole surface of the laminate with a fixed area is irradiated with the laser beam.

Figure 3:
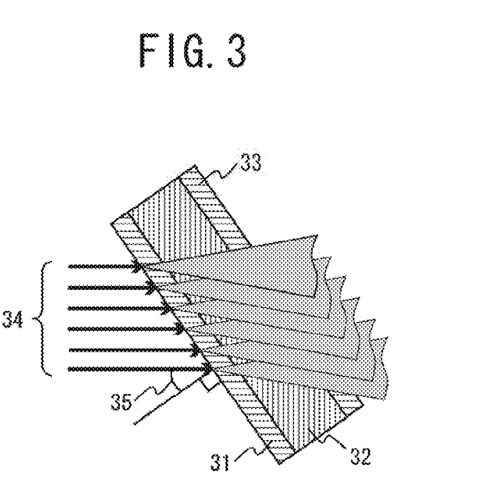
FIG. 3 is a conceptual diagram showing a method of manufacturing a directional diffusion film of the present invention.

In the step of forming the laminate, as shown in FIG. 3, it is preferable that further a substrate 33 be disposed on the photosensitive resin layer 32 stacked on the original diffusion film 31, and the step of laser beam 34 irradiation be performed, with the photosensitive resin layer 32 being held between the original diffusion film 31 and the substrate 33. When the photosensitive resin layer is sandwiched with the substrate, laser beam irradiation can be performed in the state where it tends not to be affected by the leveling properties or viscosity of the photosensitive resin. Furthermore, from the viewpoint that reaction inhibition that is caused by air (oxygen) tends not to occur, it also is preferable that the laser beam irradiation be performed in the state where the photosensitive resin layer is sandwiched between the substrate and the original diffusion film.

The substrate is not particularly limited and may be a light transmissive substrate. For the light transmissive substrate, a transparent plastic film substrate can be used suitably. The transparent plastic film is preferable since one having excellent transmittance of irradiation light (preferably a light transmittance of at least 90%) in the light irradiation step and good transparency (preferably a haze value of 1% or lower) tends not to affect the laminate by diffuse reflection or heat generated by irradiation light. Furthermore, a film having unevenness on one surface thereof is used as the transparent plastic film substrate, and the photosensitive resin layer may be disposed on each of the surface having unevenness and the opposite surface thereto. The film having unevenness also is allowed to function as an antiglare layer to be described later. Examples of the material for forming the transparent plastic film substrate include polyester type polymers such as polyethylene terephthalate and polyethylene naphthalate, cellulose type polymers such as diacetyl cellulose and triacetyl cellulose, polycarbonate type polymers, and acrylic type polymers such as polymethylmethacrylate. Examples of the material for forming the transparent plastic film substrate also include styrene type polymers such as polystyrene and an acrylonitrile-styrene copolymer, olefin type polymers such as polyethylene, polypropylene, polyolefin that has a cyclic or norbornene structure, and an ethylene-propylene copolymer, vinyl chloride type polymers, and amide type polymers such as nylon and aromatic polyamide. Furthermore, examples of the material for forming the transparent plastic film substrate also include imide type polymers, sulfone type polymers, polyether sulfone type polymers, polyether-ether ketone type polymers, polyphenylene sulfide type polymers, vinyl alcohol type polymers, vinylidene chloride type polymers, vinyl butyral type polymers, allylate type polymers, polyoxymethylene type polymers, epoxy type polymers, and blends of the above-mentioned polymers.

In the present invention, the thickness of the transparent plastic film substrate is not particularly limited. For example, the thickness is preferably in the range of 10 to 500 μm, more preferably in the range of 15 to 300 μm, and most suitably in the range of 20 to 200 μm, with consideration given to strength, workability such as handling properties, and thin layer properties. The refractive index of the transparent plastic film substrate is not particularly limited. The refractive index is, for example, in the range of 1.30 to 1.80 and preferably in the range of 1.40 to 1.70. In the laser beam irradiation step, the difference in refractive index between the film substrate and the photosensitive resin layer is preferably 0.2 or less and more preferably 0.1 or less so that the effect of reflection at the interface between the transparent plastic film substrate and the photosensitive resin layer is reduced as much as possible.

Next, a polarizing plate is described that includes a directional diffusion film of the present invention stacked therein. It is possible to obtain a polarizing plate with functions of the present invention by stacking the directional diffusion film of the present invention on a polarizer or a polarizing plate using, for example, an adhesive or a pressure sensitive adhesive. The directional diffusion film of the present invention is stacked on a polarizer to serve as a protective layer and thereby a polarizing plate can be obtained. In this case, the substrate may be a polarizer itself. Such a structure does not need a protective layer formed of, for example, triacetylcellulose (TAC) and can simplify the structure of the polarizing plate. Accordingly, such a structure makes it possible to reduce the number of steps for manufacturing a polarizing plate or LCD and to increase production efficiency. In addition, such a structure allows the polarizing plate to be thinner.

The polarizer is not particularly limited and various types can be used. Examples of the polarizer include: a film that is uniaxially stretched after a hydrophilic polymer film, such as a polyvinyl alcohol type film, a partially formalized polyvinyl alcohol type film, or an ethylene-vinyl acetate copolymer type partially saponified film, is allowed to adsorb a dichromatic substance such as iodine or a dichromatic dye; and a polyene type oriented film, such as a dehydrated polyvinyl alcohol film or a dehydrochlorinated polyvinyl chloride film. Particularly, a polarizer formed of a polyvinyl alcohol type film and a dichromatic material such as iodine is preferred because it has a high polarization dichroic ratio. The thickness of the polarizer is not particularly limited and is, for example, about 5 to 80 μm.

A polarizer that is obtained by dyeing a polyvinyl alcohol type film with iodine and then uniaxially stretching it can be produced as follows. That is, for example, a polyvinyl alcohol type film is immersed in an aqueous solution of iodine to be dyed and is then stretched by 3 to 7 times the original length. The aqueous solution of iodine may contain, for example, boric acid, zinc sulfate, or zinc chloride, if necessary. Separately, the polyvinyl alcohol type film may be immersed in an aqueous solution containing, for example, boric acid, zinc sulfate, or zinc chloride. Furthermore, before dyeing, the polyvinyl alcohol type film may be immersed in water to be washed therein if needed. Washing the polyvinyl alcohol type film with water allows antiblocking agents and soils on the polyvinyl alcohol type film surface to be washed off and also provides an effect of preventing non-uniformity, such as unevenness in dyeing, from occurring by allowing the polyvinyl alcohol type film to swell. The polyvinyl alcohol type film may be stretched after being dyed with iodine, may be stretched while being dyed, or may be dyed with iodine after being stretched. Stretching can be carried out in an aqueous solution of, for example, boric acid or potassium iodide or in a water bath.

A different protective layer from the aforementioned directional diffusion film may be provided on one surface of the polarizer. A transparent protective film can be used as the aforementioned protective layer. A preferable transparent protective film is one that is excellent in, for example, transparency, mechanical strength, thermal stability, moisture-blocking properties, and retardation value stability. Examples of the material for forming the transparent protective film include the same materials as those used for the aforementioned transparent plastic film substrate.

Moreover, examples of the transparent protective film also include polymer films described in JP 2001-343529 A (WO01/37007), incorporated herein by reference. The polymer films described in JP 2001-343529 A, incorporated herein by reference, are formed of, for example, resin compositions containing (A) thermoplastic resins having at least one of a substituted imide group and a non-substituted imide group in the side chain thereof and (B) thermoplastic resins having at least one of a substituted phenyl group and a non-substituted phenyl group as well as a nitrile group in the side chain thereof. Examples of the polymer films formed of the resin compositions described above include one formed of a resin composition containing an acrylonitrile-styrene copolymer and an alternating copolymer composed of isobutylene and N-methyl maleimide. The polymer film can be produced by extruding the resin composition in the form of a film. The polymer film has a small retardation and a small photoelastic coefficient and thus can eliminate defects such as unevenness due to distortion when it is used as a protective film for, for example, a polarizing plate. The polymer film also has low moisture permeability and therefore has high moisture durability.

From the viewpoints of, for example, polarizing properties and durability, the transparent protective film is preferably a film made of cellulose resin such as triacetyl cellulose or a film made of norbornene resin. Examples of commercial products of the transparent protective film include FUJITAC (trade name) (manufactured by Fuji Photo Film Co., Ltd.), ZEONOA (trade name) (manufactured by Nippon Zeon Co., Ltd.), and ARTON (trade name) (manufactured by JSR Corporation).

The thickness of the transparent protective film is not particularly limited. It can be, for example, in the range of 1 to 500 μm from the viewpoints of strength, workability such as handling properties, and thin layer properties. In the above range, the transparent protective film can mechanically protect a polarizer and can prevent a polarizer from shrinking and retain stable optical properties even when exposed to high temperature and high humidity. The thickness of the transparent protective film is preferably in the range of 5 to 200 μm and more preferably in the range of 10 to 150 μm.

Preferably, the polarizing plate of the present invention includes a hard-coating layer. The diffusion that is caused by the directional diffusion film of the present invention is not attributed to the surface unevenness. Accordingly, the directional diffusion film need not necessarily be provided as the outermost layer. Preferably, the hard-coating layer is located as the outermost layer but may be provided on the directional diffusion film or on an opposite surface to that of the polarizer on which the directional diffusion film has been stacked.

Examples of the hard-coating resin for forming the hard-coating layer include thermosetting resin, thermoplastic resin, ultraviolet curable resin, ionizing radiation curable resin, and two-component mixed resin. Among these, the ultraviolet curable resin that allows a hard-coating layer to be formed efficiently by a simple processing operation, namely a curing treatment using ultraviolet irradiation, is used particularly preferably. In this case, an ultraviolet polymerization initiator (photopolymerization initiator) is mixed into the ultraviolet curable resin.

Examples of the ultraviolet curable resin include those of various types such as a polyester type, acrylic type, urethane type, silicone type, and epoxy type. Examples of this ultraviolet curable resin include ultraviolet curable monomers, oligomers, and polymers. Examples of the ultraviolet curable resin that is used particularly preferably include those each having an ultraviolet polymerizable functional group, particularly, those containing acrylic type monomers or oligomers having at least two of the functional groups, particularly, three to six of them.

Specific examples of such an ultraviolet curable resin include acrylate resin of, for example, acrylic ester of polyhydric alcohol, methacrylate resin of, for example, methacrylic ester of polyhydric alcohol, polyfunctional urethane acrylate resin that is synthesized from diisocyanate, polyhydric alcohol, and hydroxyalkyl ester of acrylic acid, and polyfunctional urethane methacrylate resin that is synthesized from, for example, polyhydric alcohol and hydroxy methacrylic ester of methacrylic acid. Furthermore, for example, polyether resin, polyester resin, epoxy resin, alkyd resin, spiroacetal resin, polybutadiene resin, or polythiolpolyene resin, which has an acrylate type functional group, also can be used suitably as required. Moreover, for example, melamine type resin, urethane type resin, alkyd type resin, or silicone type resin also is used preferably.

Examples of the photopolymerization initiator include 2,2-dimethoxy-2-phenylacetophenone, acetophenone, benzophenone, xanthone, 3-methylacetophenone, 4-chlorobenzophenone, 4,4'-dimethoxybenzophenone, benzoin propyl ether, benzyl dimethyl ketal, N, N,N',N'-tetramethyl-4,4'-diaminobenzophenone, 1-(4-isopropylphenyl)-2-hydroxy-2-methylpropane-1-one, and other thioxanthone compounds.

One of the above-mentioned resins may be used independently or two or more of them may be used in combination. Furthermore, it also is possible to use, for example, commercial ultraviolet curable resin as the aforementioned resin.

It also is preferable that the polarizing plate of the present invention include an antiglare layer. The antiglare layer can be obtained by providing an uneven shape for the surface of the hard-coating layer. It also is preferable that the hard-coating layer contain fine particles so that the surface structure thereof is allowed to be an uneven structure to impart antiglare properties thereto. Examples of the fine particles include inorganic fine particles and organic fine particles. The inorganic fine particles are not particularly limited. Examples thereof include silicon oxide fine particles, titanium oxide fine particles, aluminum oxide fine particles, zinc oxide fine particles, tin oxide fine particles, calcium carbonate fine particles, barium sulfate fine particles, talc fine particles, kaolin fine particles, and calcium sulfate fine particles. The organic fine particles also are not particularly limited. Examples thereof include polymethyl methacrylate resin powder (PMMA fine particles), silicone resin powder, polystyrene resin powder, polycarbonate resin powder, acrylic-styrene resin powder, benzoguanamine resin powder, melamine resin powder, polyolefin resin powder, polyester resin powder, polyamide resin powder, polyimide resin powder, and polyethylene fluoride resin powder. With respect to these inorganic fine particles and organic fine particles, one of them may be used independently or two or more of them may be used in combination.

The weight average particle size of the fine particles is in the range of 30 to 75% of the film thickness of the hard-coating layer and preferably in the range of 30 to 50%. When the weight average particle size of the fine particles is 30% or more, a sufficiently uneven shape can be formed at the surface of the hard-coating layer and thereby can impart a sufficient antiglare function thereto. On the other hand, when the weight average particle size of the fine particles is 75% or less, a suitable difference between convexities and concavities at the surface can be obtained, therefore a good appearance can be obtained, and further reflected light can be scattered suitably.

The shape of each fine particle is not particularly limited. For instance, the shape can be a bead-like, substantially spherical shape or can be an indeterminate shape like powder. The weight average particle size of the fine particles is, for example, in the range of 1 to 30 µm and preferably in the range of 2 to 20 µm. The fine particles each have preferably a substantially spherical shape and more preferably a substantially spherical shape with an aspect ratio of 1.5 or lower.

The ratio of the fine particles to be added is not particularly limited and can be set suitably. The ratio of the fine particles to be added is, for example, in the range of 2 to 70 parts by weight, preferably in the range of 4 to 50 parts by weight, and more preferably in the range of 15 to 40 parts by weight, per 100 parts by weight of the entire resin components.

From the viewpoints of, for example, preventing interference fringes or light scatter from occurring at the interface between the fine particles and the hard-coating layer, it is preferable that the difference in refractive index between the fine particles and the hard-coating layer be reduced. The interference fringes are a phenomenon in which reflected light of the outside light that has been incident on the hard-coated film exhibits rainbow hue. Recently, three-wavelength fluorescent lamps with excellent clarity are used frequently in, for example, offices and interference fringes appear conspicuously under the three-wavelength fluorescent lamps. Since the refractive index of the hard-coating layer is generally in the range of 1.4 to 1.6, fine particles with a refractive index that is close to this range are preferred. Preferably, the difference in refractive index between the fine particles and the hard-coating layer is less than 0.05.

The thickness of the hard-coating layer is, for example, in the range of 15 to 25 µm and preferably in the range of 18 to 23 µm. When the thickness is within the aforementioned predetermined range, the hard-coating layer can have sufficiently high hardness (for instance, a pencil hardness of at least 4H), and curling also can be prevented more effectively. The thickness of the hard-coating layer obtained when the surface structure of the hard-coating layer is an uneven structure is, for example, in the range of 15 to 35 µm and more preferably in the range of 20 to 30 µm. The hard-coating layer may be a single layer or may have a multilayer structure with at least two layers stacked together.

It also is preferable that the polarizing plate of the present invention include an antireflection layer. The antireflection layer may be disposed on the hard-coating layer. Preferably, the antireflection layer has a refractive index in the range of 1.25 to 1.45. Light that is incident on an object undergoes phenomena such as reflection at the interface and absorption and scattering in the interior repeatedly and thereby it goes through the object and reaches the back side thereof. For example, light reflection at the interface between air and the hard-coating layer is one of the factors that cause a reduction in visibility of images when an image display has a hard-coating layer formed therein. The antireflection layer reduces the surface reflection.

In the present invention, the antireflection layer may be a thin optical film whose thickness and refractive index are controlled strictly or one including two or more of the thin optical films stacked together. The antireflection layer uses the interference effect of light to cancel opposite phases of incident light and reflected light and thereby exhibits an antireflection function. The wavelength range of visible light that allows the antireflection function to be exhibited is, for example, 380 to 780 nm, the wavelength range in which particularly high visibility is obtained is in the range of 450 to 650 nm, and preferably, the antireflection layer is designed so that the reflectance at 550 nm, which is the center wavelength, is minimized.

When the antireflection layer is designed based on the effect of interference of light, the interference effect can be enhanced by, for example, a method of increasing the difference in refractive index between the antireflection layer and the hard-coating layer. Generally, in an antireflection multilayer having a structure including two to five thin optical layers (each with strictly controlled thickness and refractive index) that are stacked together, components with different refractive indices from each other are used to form a plurality of layers with a predetermined thickness. Thus, the antireflection layer can be designed optically at a higher degree of freedom, the antireflection effect can be enhanced, and the spectral reflection characteristics also can be made uniform (flat) in the visible light range. Since each layer of the thin optical film must be highly precise in thickness, a dry process such as vacuum deposition, sputtering, or CVD is generally used to form each layer.

For the antireflection multilayer, one with a two-layer structure also is preferred, in which a low refractive index silicon oxide layer (with a refractive index of about 1.45) is stacked on a high refractive index titanium oxide layer (with a refractive index of about 1.8). One with a four-layer structure is more preferable, in which a silicon oxide layer is stacked on a titanium oxide layer, another titanium oxide layer is stacked on the silicon oxide layer, and then another silicon oxide layer is stacked thereon. The formation of the two- or four-layered antireflection layer can evenly reduce reflection over the visible light wavelength range (for example, in the range of 380 to 780 nm).

The antireflection effect also can be produced by forming a thin monolayer optical film (an antireflection layer) on the hard-coating layer. The antireflection monolayer is generally formed using a coating method such as a wet process, for example, fountain coating, die coating, spin coating, spray coating, gravure coating, roll coating, or bar coating.

Examples of the material for forming an antireflection monolayer include: resin materials such as ultraviolet curable acrylic resins; hybrid materials containing inorganic fine particles such as colloidal silica that are dispersed in a resin; and sol-gel materials containing metal alkoxide such as tetraethoxysilane and titanium tetraethoxide. Preferably, the material contains a fluorine group in order to impart antifouling surface properties. In terms of, for example, scratch resistance, the material preferably contains a large amount of an inorganic component, and the sol-gel materials are more preferable. The sol-gel materials can be used after being condensed partially.

A preferred antireflection layer is one formed of a material containing siloxane oligomers with a number average molecular weight in terms of ethylene glycol in the range of 500 to 10000 and a fluorine compound that has a number average molecular weight in terms of polystyrene of at least 5000, and includes a fluoroalkyl structure and a polysiloxane structure (the material described in JP 2004-167827 A, incorporated herein by reference) because, for example, it can have both scratch resistance and low reflection.

The antireflection layer may contain an inorganic sol in order to increase film strength. The inorganic sol is not particularly limited and examples thereof include inorganic sols of, for example, silica, alumina, and magnesium fluoride. Particularly, silica sol is preferred. The ratio of the inorganic sol to be added is, for example, in the range of 10 to 80 parts by weight, per 100 parts by weight of the total solids of the material for forming the antireflection layer. The size of the inorganic fine particles in the inorganic sol is preferably in the range of 2 to 50 nm and more preferably in the range of 5 to 30 nm.

The material for forming the antireflection layer preferably contains hollow spherical silicon oxide ultrafine particles. The silicon oxide ultrafine particles have preferably an average particle size of around 5 to 300 nm and more preferably in the range of 10 to 200 nm. The silicon oxide ultrafine particles are in the form of hollow spheres each including a pore-containing outer shell, inside of which a hollow is formed. The hollow contains at least one of a solvent and a gas that has been used for preparing the silicon oxide ultrafine particles. A precursor substance for forming the hollow of the silicon oxide ultrafine particle preferably remains in the hollow. The thickness of the outer shell is preferably in the range of about 1 to 50 nm and in the range of approximately 1/50 to 1/5 of the average particle size of the silicon oxide ultrafine particles. Preferably, the outer shell is formed of a plurality of coating layers. In the silicon oxide ultrafine particles, it is preferable that the pores be blocked and the hollow be sealed with the outer shell. This is because the antireflection layer maintains a porous structure or a hollow of the silicon oxide ultrafine particles and therefore can have a further reduced refractive index. The method of manufacturing such hollow spherical silicon oxide ultrafine particles, which is employed suitably, is, for example, a method of manufacturing silica fine particles disclosed in JP 2001-233611 A.

The temperature for drying and curing that is employed in forming the antireflection layer is not particularly limited and is, for example, in the range of 60 to 150° C. and preferably in the range of 70 to 130° C. The period of time for drying and curing is, for instance, in the range of 1 to 30 minutes and preferably in the range of 1 to 10 minutes in view of productivity. After drying and curing, the layer is further heat-treated, so that a polarizing plate including an antireflection layer can be obtained. The temperature for the heat treatment is not particularly limited and is, for example, in the range of 40 to 130° C. and preferably in the range of 50 to 100° C. The period of time for the heat treatment is not particularly limited and is, for instance, 1 minute to 100 hours and more preferably at least 10 hours in terms of improving scratch resistance. The heat treatment can be performed by a method using, for example, a hot plate, an oven, or a belt furnace.

When the polarizing plate including the antireflection layer is attached to an image display, the antireflection layer may frequently serve as the outermost layer and thus is susceptible to stains from the external environment. Stains are more conspicuous on the antireflection layer than on, for instance, a simple transparent plate. In the antireflection layer, for example, deposition of stains such as fingerprints, thumbmarks, sweat, and hair dressing products may change the surface reflectance, or the deposition may appear to stand out whitely to make the displayed content unclear. Preferably, an antistain layer formed of, for example, a fluoro-silane compound or a fluoro-organic compound is stacked on the antireflection layer in order to prevent deposition of stains and improve the ease of removal of the stains deposited.

The liquid crystal display of the present invention is provided with the aforementioned directional diffusion film of the present invention or the aforementioned polarizing plate of the present invention. The liquid crystal display include a polarizing plate and an optical compensation layer that are disposed on the viewing side. The transmission axis direction of the polarizer of the polarizing plate is the same direction as the alignment axis direction of the optical compensation layer. The diffusion axis direction of a directional diffusion film of the polarizing plate forms preferably an angle in the range of −105° to −165° with respect to the alignment axis of the optical compensation layer, more preferably in the range of −115° to −155°, and particularly preferably in the range of −125° to −145°. Since tone reversal occurs at −135° most conspicuously, it is preferable that the angle range be set at around −135°. When it is disposed to be in the aforementioned angle range, a liquid crystal display can be obtained in which the front contrast is maintained while tone reversal in the downward direction of the panel is prevented more effectively from occurring.

Preferably, the aforementioned optical compensation layer is, for example, one including a liquid crystal layer formed through application of a liquid crystalline material onto a support film of, for example, TAC, and the liquid crystal layer is a liquid crystal incline-oriented layer such as one obtained through tilt orientation of discotic liquid crystal or one obtained through tilt orientation of nematic liquid crystal.

The polarizing plate and liquid crystal display of the present invention each includes at least a polarizer and a protective layer that are stacked together, and the protective layer is a directional diffusion film of the present invention. However, since the diffusion that is caused by the directional diffusion film is not attributed to the surface unevenness, the directional diffusion film need not necessarily be provided as the outermost layer and therefore design can be made at an increased degree of freedom. Preferably, the liquid crystal display of the present invention is formed by stacking, for example, the antiglare layer, the directional diffusion film, the polarizer, and the optical compensation layer sequentially from the viewing side.

The liquid crystal display produced using a directional diffusion film of the present invention is used for any suitable applications that require a wide viewing angle. Examples of the applications include office equipment such as a PC monitor, a notebook PC, and a copy machine, portable devices such as a mobile phone, a watch, a digital camera, a personal digital assistant (PDA), and a handheld game machine, home electric appliances such as a video camera, a television set, and a microwave oven, vehicle equipment such as a back monitor, a monitor for a car-navigation system, and a car audio device, display equipment such as an information monitor for stores, security equipment such as a surveillance monitor, and nursing and medical equipment such as a monitor for nursing care and a monitor for medical use.

EXAMPLES

Next, examples of the present invention are described together with comparative examples. The present invention is neither limited nor restricted by the following examples or comparative examples. Various properties and physical properties in the respective examples and comparative examples were evaluated or measured by the following methods.

<Thicknesses of Photosensitive Resin Layer and Directional Diffusion Film>

Using a digital micrometer ("K-351C" (trade name), manufactured by Anritsu Corporation), the whole thickness of the directional diffusion film and the substrates between which the film is sandwiched was measured and the thickness of the substrates was subtracted from the whole thickness. Thus the thickness of the directional diffusion film was calculated.

<Measurement in Diffusion Axis Direction>

Figure 4:
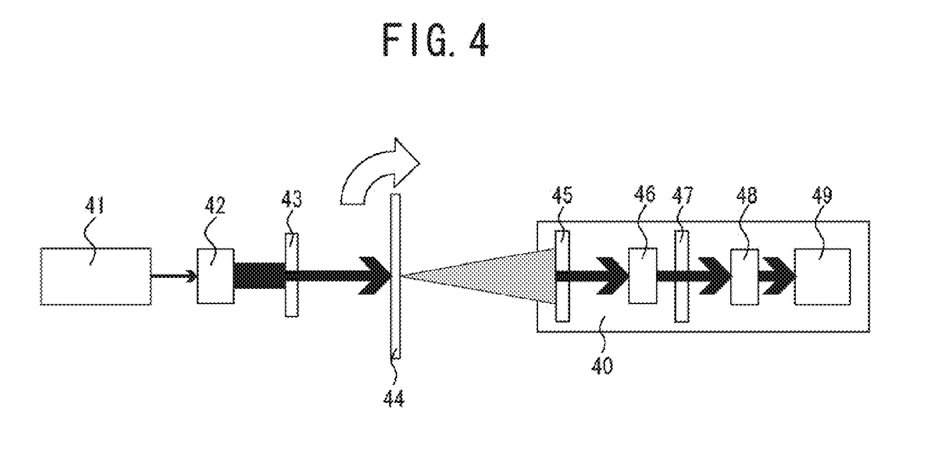
FIG. 4 is a schematic view of a diffusion axis direction measurement apparatus.

The measurement in the diffusion axis direction was performed with a goniophotometer system manufactured by Sigma Koki Co., Ltd. FIG. 4 shows a schematic view of the measurement apparatus. A laser beam with a wavelength of 532 nm emitted from a laser beam source 41 (J005GM (trade name), manufactured by Showa Optronics Co., Ltd.) was expanded with a beam expander 42 (LBED-10 (trade name), manufactured by Sigma Koki Co., Ltd.), which was then transmitted through a λ/4 wavelength plate (not shown) (WPQW-VIS-4M (trade name), manufactured by Sigma Koki Co., Ltd.) and a depolarizing element (not shown) (DEQ-2OP (trade name), manufactured by Sigma Koki Co., Ltd.). Thereafter, it passed through a slit 43 (IH-22R (trade name), manufactured by Sigma Koki Co., Ltd.) and thereby a laser beam with a diameter of 3 mm was obtained. The surface of a sample 44 was irradiated with the aforementioned laser beam with a diameter of 3 mm. The outgoing light from the sample 44 passed through a slit 45 and was then focused with a lens 46 (with a focal length f of 114.6 mm, manufactured by Sigma Koki Co., Ltd.). This was allowed to pass a pinhole 47 (manufactured by Sigma Koki Co., Ltd.) and further was collimated with a lens 48. The intensity of the light was then measured with a detector 49 (S2592-03 (trade name), manufactured by Hamamatsu Photonics Co., Ltd.). The slit 45, the lens 46, the pinhole 47, the lens 48, and the detector 49 were attached to a stage device 40 (KST-160YAW (trade name), manufactured by Sigma Koki Co., Ltd.) that is shown as a rectangle shape in planar view in the drawing so as to be located on the same straight line as the light irradiation direction of the laser beam source 41. In this case, the optical system was designed so that the viewing field was 0.5 degree. Furthermore, in the sample irradiation part, the laser beam exhibited collimation properties that were able to be checked with a collimation checker. The laser beam source 41, the sample 44, and the detector 49 were disposed so as to be located on the same straight line, a sample 44 attached to glass was placed in a sample holder, the rotation axis (SGSP-120YAW (trade name), manufactured by Sigma Koki Co., Ltd.) was allowed to be located in the sample 44 plane, the normal direction of the sample 44 plane was taken as 0°, the sample 44 was rotated from 0° to 80° in the direction in which diffusion increased, and thereby transmittance data was obtained every 1°. In the sample 44, the plane A direction containing the diffusion axis direction was found visually, and the sample 44 was disposed in the sample holder so that the rotation axis was perpendicular to the plane A (so that irradiation with the laser beam was performed along the plane A as the sample 44 rotated). The diffusion axis direction can be identified because it becomes cloudy when the sample 44 is rotated or inclined while being seen through, for example, with a fluorescent lamp. With respect to the transmittance, the reference measurement was carried out, with the sample 44 being not placed, and the light value obtained thereby was allocated and thereby the transmittance was calculated. The angle direction in which the transmittance thus calculated indicated the minimum value was taken as the diffusion axis direction. When the transmittance calculated above had two minimum values, the angle of the average value in the angle directions that indicated the minimum values was taken as the diffusion axis direction.

<Measurement of Diffusion Half-Value Angle>

Figure 9A:
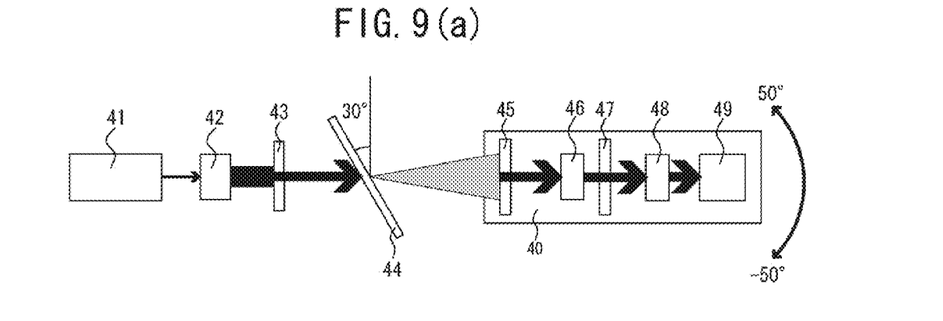
FIG. 9(a) is a schematic view of an apparatus for measuring a diffusion half-value angle.
Figure 9B:
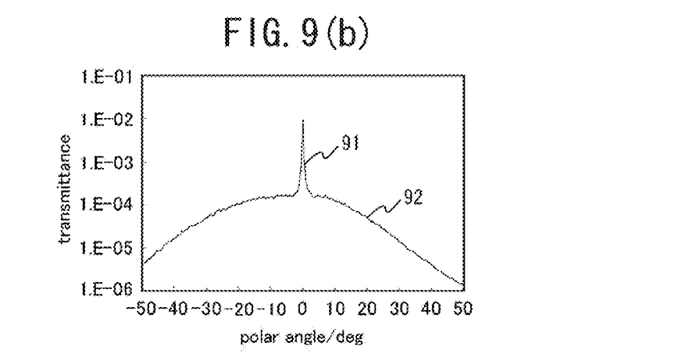
FIG. 9(b) is an example of transmittance data of the directional diffusion film.
Figure 9C:
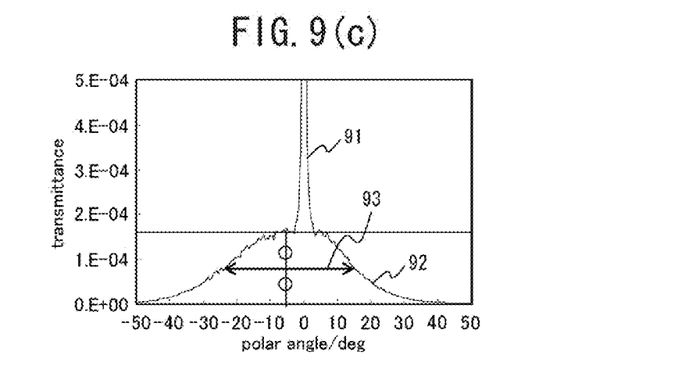
FIG. 9(c) is an enlarged view of a part of the drawing 9(b).

The aforementioned goniophotometer system manufactured by Sigma Koki Co., Ltd. was designed so that the stage device 40 equipped with the detector 49 moves on a circular arc whose center was the light irradiation position on the sample 44, and the sample 44 was disposed in the location at 30° from the normal direction of the sample 44 in the diffusion axis direction (in the direction in which diffusion increased) with respect to the light source. FIG. 9(a) is a diagram of the optical system viewed from the top. As shown in FIG. 9(a), the stage device 40 was moved left and light (the arrow directions shown in FIG. 9(a), i.e. in the directions of paper plane) in the range of −50° to 50° about the light irradiation position on the sample 44 so as to move the detector 49 and thereby transmittance data was obtained every 0.5°. FIGS. 9(b) and 9(c) show an example of the transmittance data. FIG. 9(c) is an enlarged graph of FIG. 9(b). In the transmittance data, with respect to a diffuse component 92 obtained by eliminating a transmitted component 91, a diffusion angle 93 at which the intensity of outgoing light was 50% of the peak intensity was taken as a diffusion half-value angle.

<Measurement of Diffusion Properties>

Figure 5A:
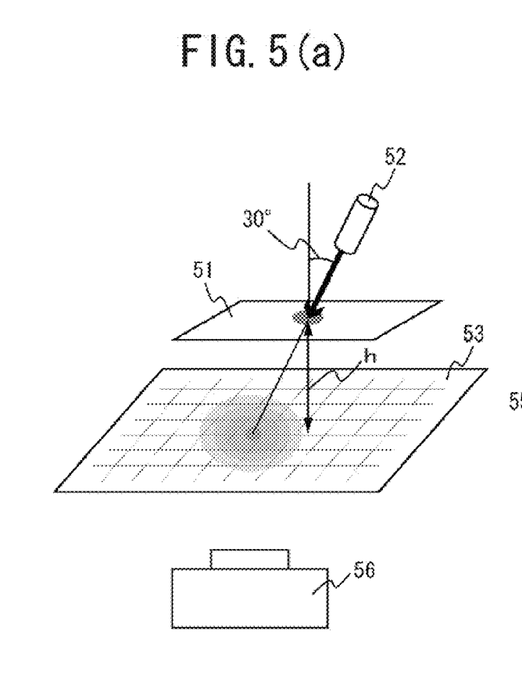
FIG. 5(a) is a schematic diagram for explaining a method of photographing a diffusion image and FIG. 5(b) is a diagram that schematically shows a photograph obtained thereby.
Figure 5B:
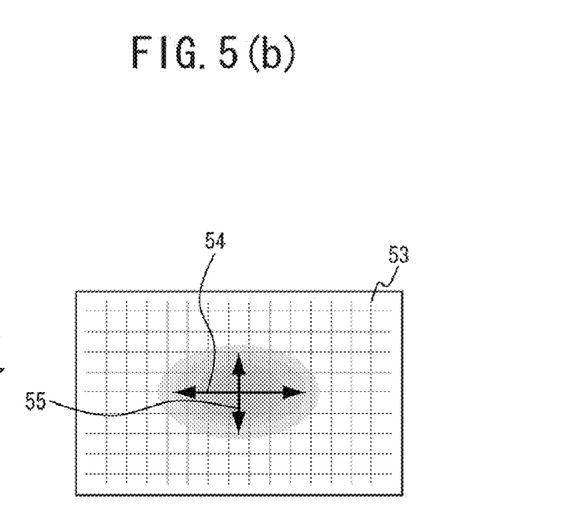

The method of evaluating diffusion properties is shown in FIG. 5(a) and FIG. 5(b). A directional diffusion film 51 that had been produced was irradiated with a laser beam 52 (a laser pointer, "GLP-FB" (trade name), manufactured by Kochi Toyonaka Giken Co., Ltd.) at an incidence angle of 30°, and the diffusion shape was photographed and thereby the diffusion properties were evaluated. As shown in FIG. 5(a), the directional diffusion film 51 and a squared paper 53 were placed in parallel with each other at an interval of a fixed distance h (6 cm), and an image projected on the squared paper 53 through projection of diffusion light was photographed from the back face by a camera 56. FIG. 5(b) shows the photograph schematically. In the photograph (FIG. 5(b)), the diameters of the diffusion light in the polar angle direction 54 and the azimuthal direction 55 were measured by the method described later, using the scale of squared paper (white PS sheet (with a thickness of 0.5 mm, manufactured by Nihon Plastic Industry Co., Ltd.) with a scale written thereon). The photograph was taken with a digital camera ("DSC-H5", manufactured by Sony Corporation), with the distance between the squared paper and the camera lens surface being 15 cm. The photographing conditions were as follows: ISO speed: 200, white balance: auto, shutter speed: ⅟25 sec, aperture: F3.8, and focus adjustment: manual. The diffusion properties of the directional diffusion film are indicated by the ratio of the diameter in the polar angle direction to the diameter in the azimuthal direction.

In the length measurement, the image of the photograph obtained above was digitalized by the following image processing method. FIG. 8 shows an example of image processing. The image of the photograph was imported using "IMAGE-PRO PLUS 5.1" manufactured by Media Cybernetics. The image thus imported was converted into 8-bit grayscale (FIG. 8(a)), and the digitalization process was performed (FIG. 8(b)). In the digitalization process, the image thus obtained was shown with 256 grayscales (0: black, 255: white), which was then divided by every $50^{th}$ grayscale, and data of 50 to 255 grayscales were imported as images. In the images obtained by the aforementioned digitalization process, an ellipse figure 81 was placed so as to surround the outer shape of the figure (FIG. 8(c)) and then the axis 84 in the polar angle direction and the axis 85 in the azimuthal direction of the ellipse figure 81 were measured (FIG. 8(d)). Thereafter, the ratio of the lengths thus measured (=(the length in the polar angle direction)/(the length in the azimuthal direction)) was calculated.

<Measurement of Viewing Angle (Grayscale Normal Angle)>

With a conoscope test system (manufactured by AUTRONIC-MELCHERS), the luminance of 9 grayscales from white to black was measured within a viewing angle range of +80° to −80° of a transmissive liquid crystal display panel with a directional diffusion film attached thereto. The plus direction denotes the upward direction of the panel and the minus direction denotes the downward direction of the panel. FIG. 2 shows an example of the result of measurement with respect to a transmissive liquid crystal display panel (FP-93VW, manufactured by BENQ) with no directional diffusion film used therein. In the region where the respective grayscales do not cross each other, no tone reversal is observed. In the examples, the angle of the aforementioned region in the downward direction of the panel was referred to as a "grayscale normal angle" R. For the transmissive liquid crystal panel that does not include the aforementioned directional diffusion film, one was used that was obtained by removing polarizing plates from both surfaces of the FP-93VW manufactured by BENQ and bonding SEG1424FWNL manufactured by Nitto Denko Corporation to both surfaces of the panel from which the polarizing plates had been removed.

<Front Contrast Ratio>

With the front contrast value of a transmissive liquid crystal display panel in which the directional diffusion film was not used being employed as a reference, the ratios of the front contrast values with respect to the respective examples and comparative examples were indicated by percentage. The front contrast value denotes the ratio between white luminance and black luminance at 0° in the aforementioned measurement of grayscale normal angle.

<Exposure Apparatus>

Figure 6:
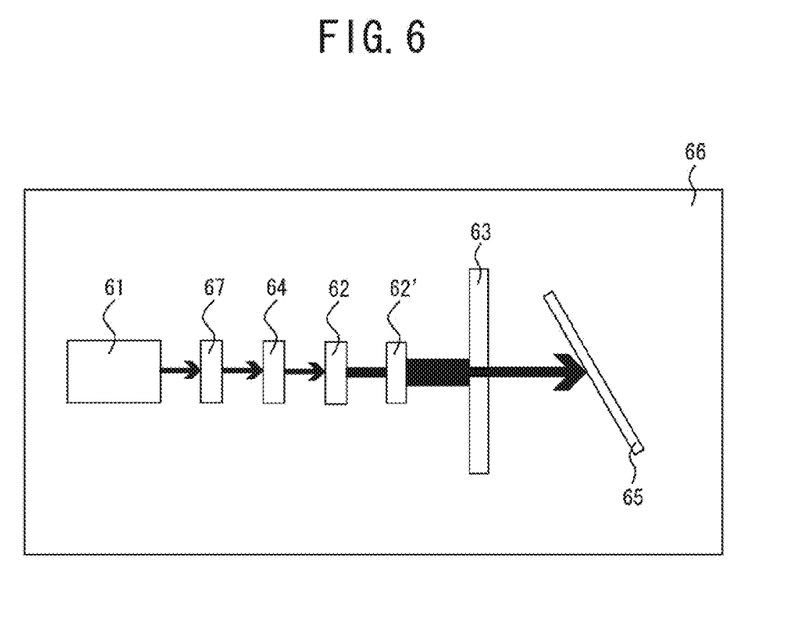
FIG. 6 is a schematic view of an exposure apparatus used for producing a directional diffusion film in the examples of the present invention.

FIG. 6 shows a schematic view of an exposure apparatus used for producing a directional diffusion film in the examples. A Nd:YVO$_4$ laser 61 (532 nm) (VERDI-V8, manufactured by Coherent Inc.) and Galileo-type beam expanders 62, 62' (3× (with an emission lens diameter of 20 mm) and 105× (with an emission lens diameter of 100 mm)) manufactured by Sigma Koki Co., Ltd.) were attached to a vibration isolation table 66 (HOA-2010-150LA, manufactured by Sigma Koki Co., Ltd.) to expand a beam light. They were attached so that the laser beam thus expanded was allowed to pass through a window 63 with a size of 50×50 mm and thereby only a center region thereof with a substantially uniform light intensity was able to be emitted. In FIG. 6, the reference numeral 67 indicates a shutter. The lens was adjusted to obtain parallel light in all the planes after the laser beam passed through the aforementioned respective beam expanders 62, 62'. The parallel degree of the laser beam was checked using a collimation checker (SPV-25, manufactured by Sigma Koki Co., Ltd.). The light intensity of the laser beam was reduced by using a variable attenuator 64 (manufactured by Sigma Koki Co., Ltd.) and was adjusted to a predetermined value using a power meter (PH100-Si, manufactured by Gentec) and a monitor (SOLO, manufactured by Gentec). With respect to the in-plane exposure uniformity, an aperture with a diameter of 1 mm was attached to the power meter, measurement was performed with respect to 25 points located evenly in the plane of 50×50 mm, and thereby the error was confirmed to be 15% or less. Furthermore, the sample holder 65 was placed at an angle with respect to the laser beam.

Example 1

Production of Test Piece

Photopolymer NPN-005 manufactured by Nippon Paint Co., Ltd. was applied to a polyethylene terephthalate (PET) film (product number: S27W, with a thickness of 75 μm, manufactured by Toray Industries, Inc.) using an applicator (an applicator manufactured by Tester Sangyo Co., Ltd.). This was dried with a heating apparatus (SPH-201, manufactured by Espec Corporation) at 90° C. for five minutes and thereby a 20-μm thick coating film (100×150 mm) was obtained on the PET film. Furthermore, a second PET film that was identical to the aforementioned PET film was laminated on the coated film surface of the PET film. A diffusion film ("LSD20PE5" (trade name) with a half-value width of 200, manufactured by Luminit) was attached as an original diffusion film to the second PET film surface, with a pressure sensitive adhesive (No. 7, manufactured by Nitto Denko Corporation) interposed therebetween. This was used as a test piece. The operation described above was performed in an environment in which an incandescent lamp (20 W) equipped with "Safe Light Glass" No. 3 manufactured by Asanuma & Co., Ltd. was used. The test piece thus produced was wrapped with aluminum foil to be prevented from being exposed.

<Production of Directional Diffusion Film>

The surface of the test piece where the original diffusion film had been attached was irradiated with light at a light intensity of 2.0 mW/cm$^2$, an accumulated light intensity of 27 mJ/cm$^2$, and an irradiation angle of 30° using the aforementioned exposure apparatus. Thereafter, the original diffusion film was removed from the test piece and it was heated at 100° C. for 10 minutes on a glass sheet placed in a heating apparatus (SPH-201, manufactured by Espec Corporation). Subsequently, the whole surface was irradiated at 4.0 J/cm$^2$ with an ultraviolet irradiation device (UVC-321AM1 (high pressure mercury lamp), manufactured by Ushio Inc.). After that, the second PET film was removed from the test piece and thereby a directional diffusion film of this example was obtained. The operations carried out up to before the ultraviolet irradiation were performed in an environment in which an incandescent lamp (20 W) equipped with "Safe Light Glass" No. 3 manufactured by Asanuma & Co., Ltd. was used, and the aluminum foil was used for wrapping during heating to prevent exposure.

<Mounting onto TN Panel>

Figure 7A:
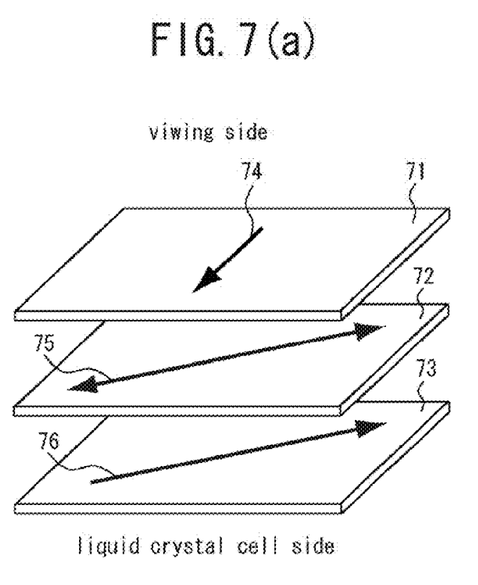
FIG. 7(a) is a schematic exploded view of a polarizing plate and FIG. 7(b) is a diagram for explaining an axial configuration, with a polarizing plate being viewed from the viewing side.
Figure 7B:
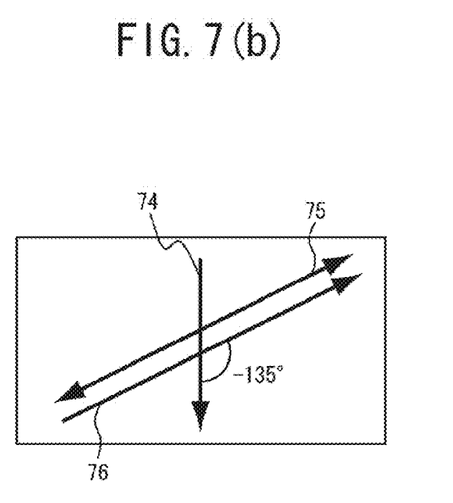
Figure 8A:
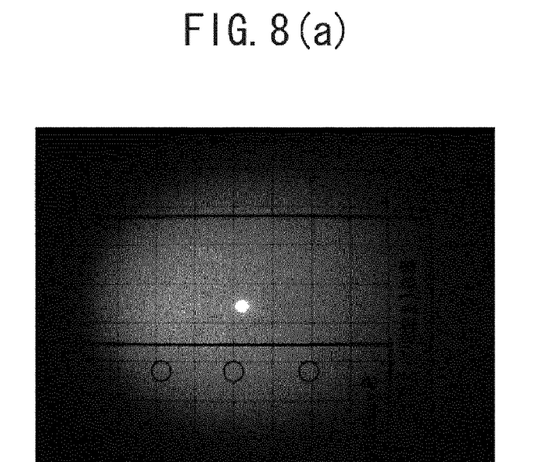
FIG. 8(a) is an example of an image that has been converted into 8-bit grayscale.
Figure 8B:
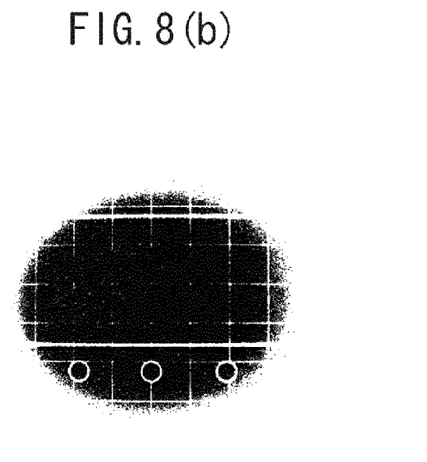
FIG. 8(b) is an example of the image obtained by a digitalization process.
Figure 8C:
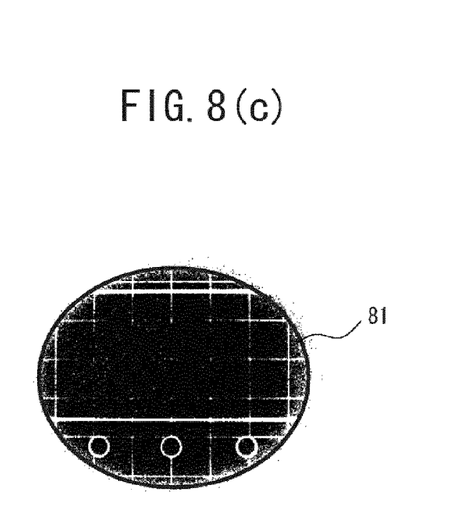
FIG. 8(c) is an image in which an ellipse figure is fitted into the image (b) obtained by the digitalization process.
Figure 8D:
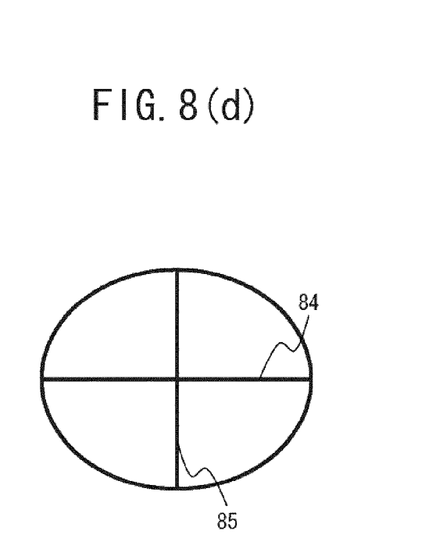
FIG. 8(d) is a diagram for explaining the positions where the length in the polar angle direction and the length in the azimuthal direction are measured.

The liquid crystal panel used herein was one obtained by removing polarizing plates located on both surfaces of FP-93VW manufactured by BENQ and bonding SEG1424FWNL (including a polarizer and a liquid crystal incline-oriented layer) manufactured by Nitto Denko Corporation to the both surfaces of the panel from which the polarizing plates had been removed. The side of the directional diffusion film obtained as described above from which the second PET film had been removed was bonded to the viewing side of the liquid crystal panel so that an axial configuration shown in FIG. 7 was obtained. That is, a directional diffusion film 71, polarizer 72, and liquid crystal incline-oriented layer 73 were stacked together in this order from the viewing side, the absorption axis direction 75 of the polarizer was allowed to be the same direction as the alignment axis direction 76 of the liquid crystal incline-oriented layer, and the diffusion axis direction 74 of the directional diffusion film and the alignment axis direction 76 of the liquid crystal incline-oriented layer were allowed to form an angle of −135° therebetween. A pressure sensitive adhesive (No. 7, manufactured by Nitto Denko Corporation) was used for bonding the directional diffusion film and the liquid crystal panel to each other.

Example 2

A directional diffusion film according to this example was produced under the same conditions as those employed in Example 1 except that the irradiation angle was 20°.

Example 3

A directional diffusion film according to this example was produced under the same conditions as those employed in Example 1 except that the irradiation angle was 40°.

Example 4

A directional diffusion film according to this example was produced under the same conditions as those employed in Example 1 except that a diffusion film ("LSD" (trade name), with a half-value width of 400, manufactured by Luminit) was used as the original diffusion film.

Example 5

A directional diffusion film according to this example was produced under the same conditions as those employed in Example 1 except that an anisotropy diffusion film ("LSD" (trade name), with a half-value width of 18×5°, manufactured by Luminit) was used as the original diffusion film. In this case, in the anisotropy diffusion film, the half-value width of 18×5° denotes that there is a direction with the smallest half-value width that is, in the same plane, perpendicular to a direction with the largest half-value width, and the maximum value of the half-value width is 18° while the minimum value is 5°. The exposure at an exposure angle of 30° was performed, with the direction with the smallest half-value width being taken as a rotation axis.

Example 6

A directional diffusion film according to this example was produced under the same conditions as those employed in Example 1 except that an anisotropy diffusion film ("LSD" (trade name), with a half-value width of 23×8°, manufactured by Luminit) was used as the original diffusion film. In this case, in the anisotropy diffusion film, the half-value width of 23×8° denotes that there is a direction with the smallest half-value width that is, in the same plane, perpendicular to a direction with the largest half-value width, and the maximum value of the half-value width is 23° while the minimum value is 8°. The exposure at an exposure angle of 30° was performed, with the direction with the smallest half-value width being taken as a rotation axis.

Example 7

A directional diffusion film according to this example was produced under the same conditions as those employed in Example 1 except that an anisotropy diffusion film ("LSD" (trade name), with a half-value width of 40×10°, manufactured by Luminit) was used as the original diffusion film. In this case, in the anisotropy diffusion film, the half-value width of 40×10° denotes that there is a direction with the smallest half-value width that is, in the same plane, perpendicular to a direction with the largest half-value width, and the maximum value of the half-value width is 40° while the minimum value is 10°. The exposure at an exposure angle of 30° was performed, with the direction with the smallest half-value width being taken as a rotation axis.

Example 8

A directional diffusion film according to this example was produced under the same conditions as those employed in Example 6 except that the coating thickness of the photopolymer was 7 μm.

Example 9

A directional diffusion film according to this example was produced under the same conditions as those employed in Example 6 except that the coating thickness of the photopolymer was 12 μm.

Example 10

A directional diffusion film according to this example was produced under the same conditions as those employed in Example 6 except that the coating thickness of the photopolymer was 40 μm.

Example 11

A directional diffusion film according to this example was produced under the same conditions as those employed in Example 6 except that the coating thickness of the photopolymer was 50 μm.

Example 12

Using the directional diffusion film obtained in Example 1, the transmission axis direction of the polarizer was allowed to be the same direction as the alignment axis direction of the liquid crystal incline-oriented layer, and the diffusion axis direction of the directional diffusion film and the alignment axis direction of the liquid crystal incline-oriented layer were allowed to form an angle of −105° therebetween.

Example 13

Using the directional diffusion film obtained in Example 1, the transmission axis direction of the polarizer was allowed to be the same direction as the alignment axis direction of the liquid crystal incline-oriented layer, and the diffusion axis direction of the directional diffusion film and the alignment axis direction of the liquid crystal incline-oriented layer were allowed to form an angle of −125° therebetween.

Example 14

Using the directional diffusion film obtained in Example 1, the transmission axis direction of the polarizer was allowed to be the same direction as the alignment axis direction of the liquid crystal incline-oriented layer, and the diffusion axis direction of the directional diffusion film and the alignment axis direction of the liquid crystal incline-oriented layer were allowed to form an angle of −145° therebetween.

Example 15

Using the directional diffusion film obtained in Example 1, the transmission axis direction of the polarizer was allowed to be the same direction as the alignment axis direction of the liquid crystal incline-oriented layer, and the diffusion axis direction of the directional diffusion film and the alignment axis direction of the liquid crystal incline-oriented layer were allowed to form an angle of −165° therebetween.

Example 16

Using the directional diffusion film obtained in Example 1, the transmission axis direction of the polarizer was allowed to be the same direction as the alignment axis direction of the liquid crystal incline-oriented layer, and the diffusion axis direction of the directional diffusion film and the alignment axis direction of the liquid crystal incline-oriented layer were allowed to form an angle of −95° therebetween.

Example 17

Using the directional diffusion film obtained in Example 1, the transmission axis direction of the polarizer was allowed to be the same direction as the alignment axis direction of the liquid crystal incline-oriented layer, and the diffusion axis direction of the directional diffusion film and the alignment axis direction of the liquid crystal incline-oriented layer were allowed to form an angle of −175° therebetween.

Example 18

Using the directional diffusion film obtained in Example 1, the transmission axis direction of the polarizer was allowed to be the same direction as the alignment axis direction of the liquid crystal incline-oriented layer, and the diffusion axis direction of the directional diffusion film and the alignment axis direction of the liquid crystal incline-oriented layer were allowed to form an angle of −45° therebetween.

Example 19

Using the directional diffusion film obtained in Example 1, in the polarizing plate including the polarizer, liquid crystal incline-oriented layer, and directional diffusion film that are stacked in this order from the viewing side as the structure of the upper polarizing plate, the transmission axis direction of the polarizer was allowed to be the same direction as the alignment axis direction of the liquid crystal incline-oriented layer and the diffusion axis direction of the directional diffusion film and the alignment axis direction of the liquid crystal incline-oriented layer were allowed to form an angle of −135° therebetween.

Comparative Example 1

A directional diffusion film according to this comparative example was produced under the same conditions as those employed in Example 1 except that the irradiation angle was 10°.

Comparative Example 2

A directional diffusion film according to this comparative example was produced under the same conditions as those employed in Example 1 except that the irradiation angle was 50°.

Comparative Example 3

A directional diffusion film according to this comparative example was produced under the same conditions as those employed in Example 1 except that a diffusion film ("LSD" (trade name), with a half-value width of 100, manufactured by Luminit) was used as the original diffusion film.

Comparative Example 4

A directional diffusion film according to this comparative example was produced under the same conditions as those employed in Example 1 except that a diffusion film ("LSD" (trade name), with a half-value width of 50°, manufactured by Luminit) was used as the original diffusion film.

Comparative Example 5

A directional diffusion film according to this comparative example was produced under the same conditions as those employed in Example 1 except that an anisotropy diffusion film ("LSD" (trade name), with a half-value width of 64×7°, manufactured by Luminit) was used as the original diffusion film. In this case, in the anisotropy diffusion film, the half-value width of 64×7° denotes that there is a direction with the smallest half-value width that is, in the same plane, perpendicular to a direction with the largest half-value width, and the maximum value of the half-value width is 64° while the minimum value is 7°. The exposure was performed at an exposure angle of 30°, with the direction with the smallest half-value width being taken as a rotation axis.

Comparative Example 6

A directional diffuser SDF (manufactured by Toppan Printing Co., Ltd.) was used as a directional diffusion film according to this comparative example.

Comparative Example 7

A view control film "LUMISTY" MRF2555 (manufactured by Sumitomo Chemical Co., Ltd.) was used as a directional diffusion film according to this comparative example.

The following Table 1 indicates conditions employed for manufacturing directional diffusion films and evaluation results of various properties and physical properties with respect to the respective examples and comparative examples.

TABLE 1

| | Half-wide Width of Original Diffusion Film (°) | Thickness of Photosensitive Resin Layer (μm) | Irradiation Angle (°) | Diffusion Axis Direction (°) | Diffusion Half-value Angle (°) | Length of Axis (mm) Polar Angle Direction | Azimuthal Direction | Ratio | Angle of Bonding (°) | Grayscale Normal Angle (°) | Front Contrast Ratio |
|---|---|---|---|---|---|---|---|---|---|---|---|
| Example 1 | 20 | 20 | 30 | 35 | 35.9 | 70.5 | 55.6 | 1.27 | −135 | 80 | 93 |
| Example 2 | 20 | 20 | 20 | 21 | 33.2 | 56.5 | 48.2 | 1.17 | −135 | 70 | 75 |
| Example 3 | 20 | 20 | 40 | 47 | 23.5 | 57.6 | 47.5 | 1.21 | −135 | 70 | 75 |
| Example 4 | 40 | 20 | 30 | 40 | 33.6 | 68.2 | 60.0 | 1.14 | −135 | 70 | 90 |
| Example 5 | 18 × 5 | 20 | 30 | 34(41, 26) | 33.3 | 77.6 | 40.3 | 1.92 | −135 | 80 | 98 |
| Example 6 | 23 × 8 | 20 | 30 | 35(42, 27) | 41.2 | 81.3 | 44.8 | 1.81 | −135 | 80 | 95 |
| Example 7 | 40 × 10 | 20 | 20 | 45 | 39.1 | 81.1 | 44.8 | 1.81 | −135 | 70 | 85 |
| Example 8 | 23 × 8 | 7 | 30 | 38 | 41.2 | 47.8 | 32.0 | 1.49 | −135 | 40 | 98 |
| Example 9 | 23 × 8 | 12 | 30 | 40 | 41.2 | 56.3 | 35.1 | 1.60 | −135 | 75 | 97 |
| Example 10 | 23 × 8 | 40 | 30 | 42 | 41.2 | 56.3 | 39.7 | 1.42 | −135 | 80 | 83 |
| Example 11 | 23 × 8 | 50 | 30 | 42 | 41.2 | 60.0 | 43.1 | 1.39 | −135 | 80 | 68 |
| Example 12 | 20 | 20 | 30 | 35 | 35.9 | 70.5 | 55.6 | 1.27 | −105 | 80 | 88 |
| Example 13 | 20 | 20 | 30 | 35 | 35.9 | 70.5 | 55.6 | 1.27 | −125 | 80 | 92 |
| Example 14 | 20 | 20 | 30 | 35 | 35.9 | 70.5 | 55.6 | 1.27 | −145 | 80 | 90 |
| Example 15 | 20 | 20 | 30 | 35 | 35.9 | 70.5 | 55.6 | 1.27 | −165 | 75 | 86 |
| Example 16 | 20 | 20 | 30 | 35 | 35.9 | 70.5 | 55.6 | 1.27 | −95 | 60 | 92 |
| Example 17 | 20 | 20 | 30 | 35 | 35.9 | 70.5 | 55.6 | 1.27 | −175 | 65 | 89 |
| Example 18 | 20 | 20 | 30 | 35 | 35.9 | 70.5 | 55.6 | 1.27 | −45 | 50 | 89 |
| Example 19 | 20 | 20 | 30 | 35 | 35.9 | 70.5 | 55.6 | 1.27 | −135 | 80 | 92 |
| Comparative Example 1 | 20 | 20 | 10 | 10(15, 5) | 12.5 | 57.6 | 55.2 | 1.04 | −135 | 50 | 70 |
| Comparative Example 2 | 20 | 20 | 50 | 57 | 26.0 | 27.1 | 58.0 | 0.47 | −135 | 50 | 78 |
| Comparative Example 3 | 10 | 20 | 30 | 38 | 16.9 | 53.9 | 35.1 | 1.53 | −135 | 20 | 95 |
| Comparative Example 4 | 60 | 20 | 30 | Undetectable | 40.5 | 45.1 | 47.9 | 0.94 | −135 | 40 | 90 |
| Comparative Example 5 | 64 × 7 | 20 | 30 | 52 | 27.8 | 53.1 | 64.5 | 0.82 | −135 | 35 | 85 |
| Comparative Example 6 | Directional Diffuser SDF (Thickness: 30 μm) | | | 29(13, 44) | 13.2 | 54.3 | 40.5 | 1.34 | −135 | 40 | 75 |
| Comparative Example 7 | "LUMISTY" MRF2555 (Thickness: 200 μm) | | | 55 | 32.1 | 76.7 | 12.8 | 5.98 | −135 | 40 | 95 |
| ref. | — | | — | — | — | 13.4 | 13.4 | 1 | −135 | 20 | 100 |

As shown in Table 1, in the liquid crystal display with each of the directional diffusion films of the examples, good display properties were obtained in which even in the region of 50° or more below the normal direction of the display, no tone reversal occurred, normal display was obtained, and the front contrast also was prevented from decreasing. On the contrary, in the comparative examples, only those were obtained in which the region where grayscales were displayed normally was small or the front contrast decreased considerably although the normal grayscale region increased.

The directional diffusion film of the present invention is used suitably for a liquid crystal display. Examples of the applications thereof include, for example, office equipment such as a PC monitor, a notebook PC, and a copy machine, portable devices such as a mobile phone, a watch, a digital camera, a personal digital assistant (PDA), and a handheld game machine, home electric appliances such as a video camera, a television set, and a microwave oven, an ATM, vehicle equipment such as a back monitor, a monitor for a car-navigation system, and a car audio device, display equipment such as an information monitor for stores, security equipment such as a surveillance monitor, and nursing and medical equipment such as a monitor for nursing care and a monitor for medical use.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A directional diffusion film with diffusion properties that vary depending on an incidence angle,
   wherein a diffusion axis direction is in a range of 20° to 50° with respect to a normal direction of the film, and a diffusion half-value angle is at least 20° and lower than 90°,
   where the diffusion axis direction is a light irradiation direction in which the strongest diffusion light is obtained when the film is irradiated with light, and
   the diffusion half-value angle is a diffusion angle at which intensity of outgoing diffusion light at a plane A is 50% of a peak intensity, with the plane A containing the normal direction and the diffusion axis direction of the directional diffusion film, when collimated light is incident at an incidence angle of 30° from the normal direction of the directional diffusion film in the plane A.

2. The directional diffusion film according to claim 1, wherein a ratio of a length in a polar angle direction to a length in an azimuthal direction is in a range of 1 to 3, where the ratio is a ratio of the length in the polar angle direction/the length in the azimuthal direction that is obtained by measuring a length of an axis located on the plane A (the length in the polar angle direction) and a length of an other axis (the length in the azimuthal direction) with respect to a long axis and a short axis of an ellipse shape, with the plane A containing the normal direction and the diffusion axis direction of the directional diffusion film, when the collimated light is incident at an incidence angle of 30° from the normal direction of the directional diffusion film in the plane A and a diffusion image of the collimated light projected onto a projection plate placed in parallel with the directional diffusion film is fitted into the ellipse shape.

3. A polarizing plate comprising a polarizer and a protective layer that are stacked together,
wherein the protective layer is a directional diffusion film according to claim 1.

4. The polarizing plate according to claim 3, wherein the protective layer is stacked on each surface of the polarizer and at least one of the protective layers stacked on both the surfaces is a directional diffusion film according to claim 1.

5. The polarizing plate according to claim 3, comprising a hard-coating layer.

6. The polarizing plate according to claim 3, comprising an antiglare layer.

7. The polarizing plate according to claim 3, comprising an antireflection layer.

8. A liquid crystal display comprising a directional diffusion film,
wherein the directional diffusion film is a directional diffusion film according to claim 1.

9. A liquid crystal display comprising a polarizing plate,
wherein the polarizing plate is a polarizing plate according to claim 3.

10. The liquid crystal display according to claim 9, wherein a polarizing plate according to claim 3 and an optical compensation layer are provided on a viewing side and are disposed, with a transmission axis direction of a polarizer of the polarizing plate being the same direction as an alignment axis direction of the optical compensation layer, and with a diffusion axis direction of the directional diffusion film of the polarizing plate forming an angle in a range of −105° to −165° with respect to the alignment axis direction of the optical compensation layer.

11. A method of manufacturing a directional diffusion film, wherein the method comprises:
preparing at least an original diffusion film and a photosensitive resin made of at least two types of materials that are different in refractive index from each other,
forming a laminate by stacking the original diffusion film and the photosensitive resin together, and
irradiating the laminate with a collimated laser beam from a side of the original diffusion film,
where in the process of irradiating, the laminate is irradiated with the laser beam under such conditions that a half-value width of the original diffusion film is in a range of 15° to 45° and an irradiation angle of the laser beam with respect to the original diffusion film is in a range of 15° to 45°, where the half-value width denotes a diffusion angle at which an intensity of outgoing diffusion light is 50% of a peak intensity.

12. A method of manufacturing a directional diffusion film according to claim 11, wherein an original diffusion film with anisotropy is used as the original diffusion film, and in the process of irradiating, the laminate is irradiated with the laser beam, with the original diffusion film with anisotropy being placed so that a direction in which the half-value width thereof is the maximum is a direction perpendicular to a rotation axis of the irradiation angle.

13. A directional diffusion film,
Wherein the directional diffusion film is manufactured by a method of manufacturing a directional diffusion film according to claim 11.

* * * * *